US 12,487,358 B2
(12) United States Patent  
Nagai

(10) Patent No.: US 12,487,358 B2
(45) Date of Patent: Dec. 2, 2025

(54) OPTICAL DISTANCE MEASUREMENT APPARATUS

(71) Applicant: DENSO CORPORATION, Kariya (JP)

(72) Inventor: Toshiaki Nagai, Kariya (JP)

(73) Assignee: DENSO CORPORATION, Kariya (JP)

( * ) Notice: Subject to any disclaimer, the term of this patent is extended or adjusted under 35 U.S.C. 154(b) by 1123 days.

(21) Appl. No.: 17/467,356

(22) Filed: Sep. 6, 2021

(65) Prior Publication Data

US 2021/0396876 A1    Dec. 23, 2021

Related U.S. Application Data

(63) Continuation of application No. PCT/JP2020/009349, filed on Mar. 5, 2020.

(30) Foreign Application Priority Data

Mar. 7, 2019   (JP) ................................. 2019-041371

(51) Int. Cl.
*G01S 17/10*   (2020.01)
*G01S 7/4865*  (2020.01)
*G01S 7/487*   (2006.01)

(52) U.S. Cl.
CPC ............ *G01S 17/10* (2013.01); *G01S 7/4865* (2013.01); *G01S 7/487* (2013.01)

(58) Field of Classification Search
CPC ........ G01S 17/10; G01S 7/4865; G01S 7/487; G01S 17/42; G01C 3/06
See application file for complete search history.

(56) References Cited

U.S. PATENT DOCUMENTS

2014/0103196 A1    4/2014  Soga et al.
2019/0004149 A1*   1/2019  Mano ...................... G01S 17/89

FOREIGN PATENT DOCUMENTS

| DE | 10 2012 215 858 A1 | 3/2014 |
| EP | 3285087 A1 | 8/2016 |
| JP | 2005-221335 A | 8/2005 |
| JP | 2015-108629 A | 6/2015 |

* cited by examiner

*Primary Examiner* — Isam A Alsomiri
*Assistant Examiner* — Joseph C Fritchman
(74) *Attorney, Agent, or Firm* — Maschoff Brennan

(57) ABSTRACT

An optical distance measurement apparatus includes a light source unit configured to emit pulsed light in units of the number of times determined in advance, a light receiving unit including a light receiving element which receives pulsed light reflected from a first object and configured to output a response signal in accordance with received light intensity of the pulsed light, and a control unit configured to generate a histogram by accumulating and recording the response signal output from the light receiving unit, corresponding to the number of times, in a time bin in accordance with time of flight of the pulsed light and calculate a distance to the object on the basis of the histogram. The control unit changes a light emission interval of the pulsed light by the light source unit within a unit of the number of times.

8 Claims, 20 Drawing Sheets

FIG.17

FIG.19

# OPTICAL DISTANCE MEASUREMENT APPARATUS

CROSS-REFERENCE TO RELATED APPLICATION

The present application is based on and claims the benefit of priority from earlier Japanese Patent Application No. 2019-041371 filed on Mar. 7, 2019, the description of which is incorporated herein by reference.

BACKGROUND

Technical Field

The present disclosure relates to an optical distance measurement apparatus.

Related Art

Concerning an optical distance measurement apparatus, a photodetector is disclosed in which a plurality of single photon avalanche diodes (SPADs) are arranged in an array.

SUMMARY

An aspect of the present disclosure provides an optical distance measurement apparatus including: a light source unit configured to emit pulsed light in units of a number of times determined in advance; a light receiving unit including a light receiving element which receives the pulsed light reflected from a first object and configured to output a response signal in accordance with received light intensity of the pulsed light; and a control unit configured to generate a histogram by accumulating and recording the response signal output from the light receiving unit, corresponding to the number of times, in a time bin in accordance with time of flight of the pulsed light and calculate a distance to the first object on a basis of the histogram. The control unit changes a light emission interval of the pulsed light by the light source unit within a unit of the number of times.

BRIEF DESCRIPTION OF THE DRAWINGS

In the accompanying drawings:

FIG. 17 is a view illustrating a histogram according to the fourth embodiment;

FIG. 19 is a view illustrating a histogram according to the fifth embodiment;

DETAILED DESCRIPTION OF THE PREFERRED EMBODIMENTS

Concerning an optical distance measurement apparatus, for example, JP 2014-81253 A discloses a photodetector in which a plurality of single photon avalanche diodes (SPADs) are arranged in an array. At such a photodetector, one pixel is constituted with one or a plurality of SPADs, and a light receiving unit of the photodetector is constituted with a plurality of pixels. At such a photodetector, for example, reflected light of pulsed light radiated from a light source is generally received a plurality of times, and a histogram is generated on the basis of signals output from respective pixels in accordance with received light intensity of the reflected light. Further, time of flight (ToF) of the pulsed light is obtained from a position of a peak of the histogram, and a distance to a measurement target is calculated for each pixel on the basis of the ToF.

Increasing the number of times of light emission per unit time by making a light emission interval of pulsed light as small as possible and generating a histogram by repeatedly accumulating output from the pixels are effective to improve an SN ratio of a photodetector. However, if the light emission interval of a light source is made shorter than a period required for light to travel back and forth in a certain distance, the bin number of a time bin of light reflected from an object existing within a range of the distance becomes the same as the bin number of a time bin of light reflected from an object existing outside the range of the distance in the histogram in which output from the pixels is accumulated, which causes a problem that the same distance value is calculated though distances to the objects are different.

A. First Embodiment

Figure 1:
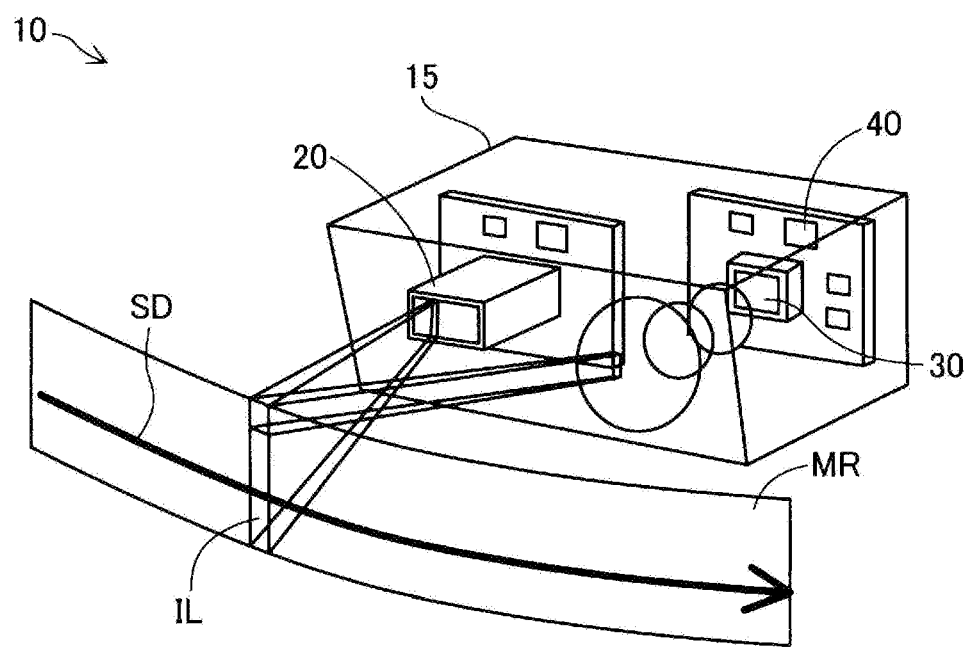
FIG. 1 is a view illustrating a schematic configuration of an optical distance measurement apparatus.

As illustrated in FIG. 1, an optical distance measurement apparatus 10 as a first embodiment in the present disclosure includes a housing 15, a light source unit 20, a light receiving unit 30, and a control unit 40. The light source unit 20 emits irradiation light IL to a measurement range MR. In the present embodiment, the light source unit 20 performs scanning with the irradiation light IL in a scanning direction SD along a horizontal direction. The irradiation light IL is formed in the shape of a rectangle having a direction orthogonal to the scanning direction SD as a longitudinal direction. The light receiving unit 30 receives reflected light from a range including the measurement range MR in accordance with irradiation of the irradiation light IL and outputs a response signal in accordance with a light receiving state of the reflected light. The control unit 40 measures a distance to an object existing within the measurement range MR by using the response signal output from the light receiving unit 30. The optical distance measurement apparatus 10 is, for example, mounted in a vehicle and is used to detect an obstacle or measure distances to other vehicles.

Figure 2:
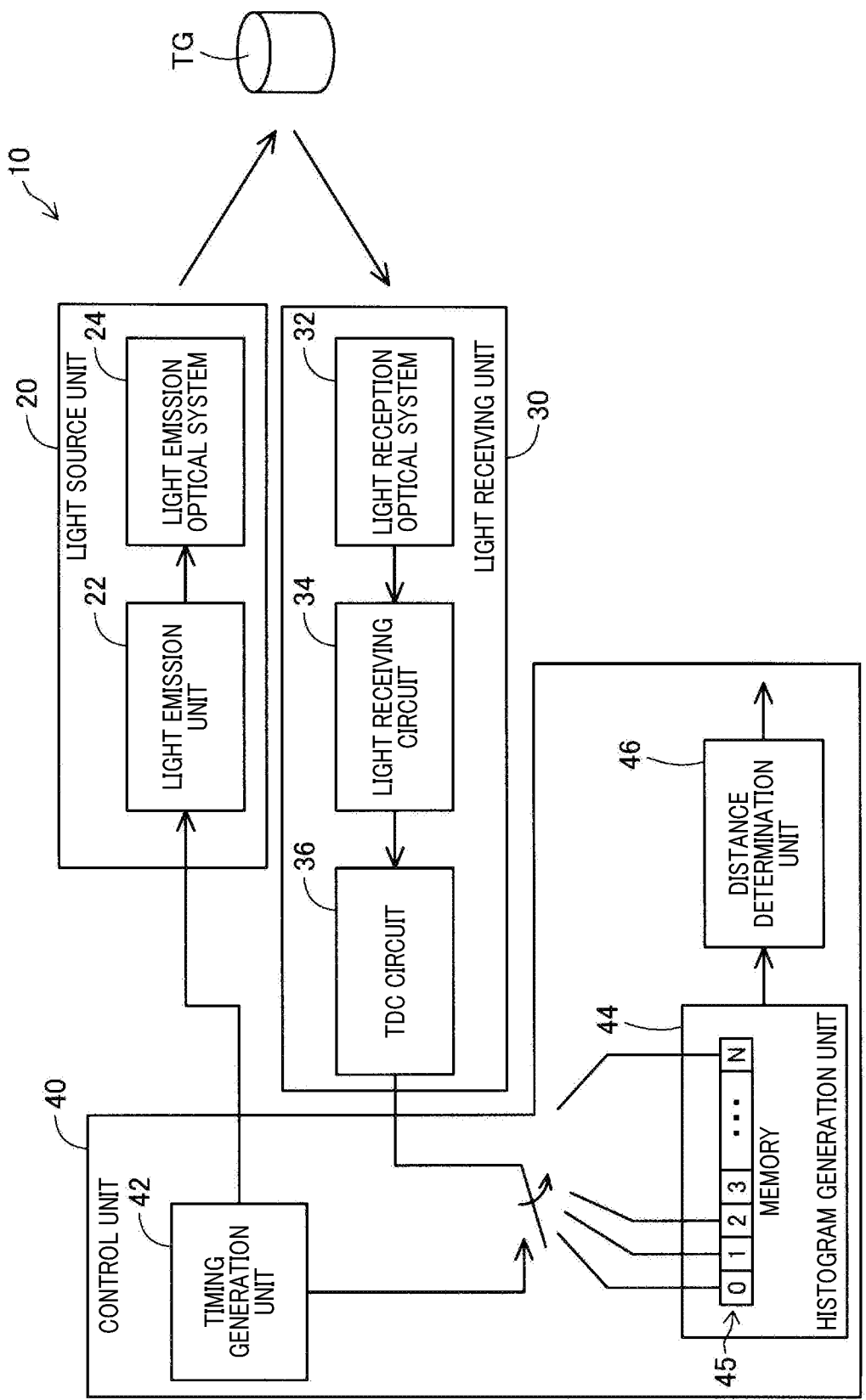
FIG. 2 is a block diagram of an optical distance measurement apparatus according to a first embodiment.

FIG. 2 illustrates a specific configuration of the optical distance measurement apparatus 10. The light source unit 20 includes a light emission unit 22 and a light emission optical system 24. The light emission unit 22, which is constituted with a semiconductor laser diode, radiates pulsed light as irradiation light. The light emission optical system 24 forms vertically long irradiation light IL illustrated in FIG. 1 from the pulsed light radiated from the light emission unit 22 and radiates the irradiation light IL to space in which an object TG exists. The light emission optical system 24, which includes, for example, a mirror constituted with micro electro mechanical systems (MEMS), performs scanning with the irradiation light IL over the measurement range MR by rotating the mirror. Note that while the light emission unit 22 is constituted with a semiconductor laser diode in the present embodiment, other light sources such as a solid-state laser may be used.

The light receiving unit 30 receives the pulsed light reflected from the object TG and outputs a response signal in accordance with received light intensity. The light receiving unit 30 includes a light reception optical system 32, a light receiving circuit 34, and a time-to-digital converter (TDC) circuit 36. The irradiation light radiated by the light source unit 20 is reflected by the object TG within the measurement range MR and received by the light receiving circuit 34 through the light reception optical system 32 constituted with various kinds of lenses.

Figure 3:
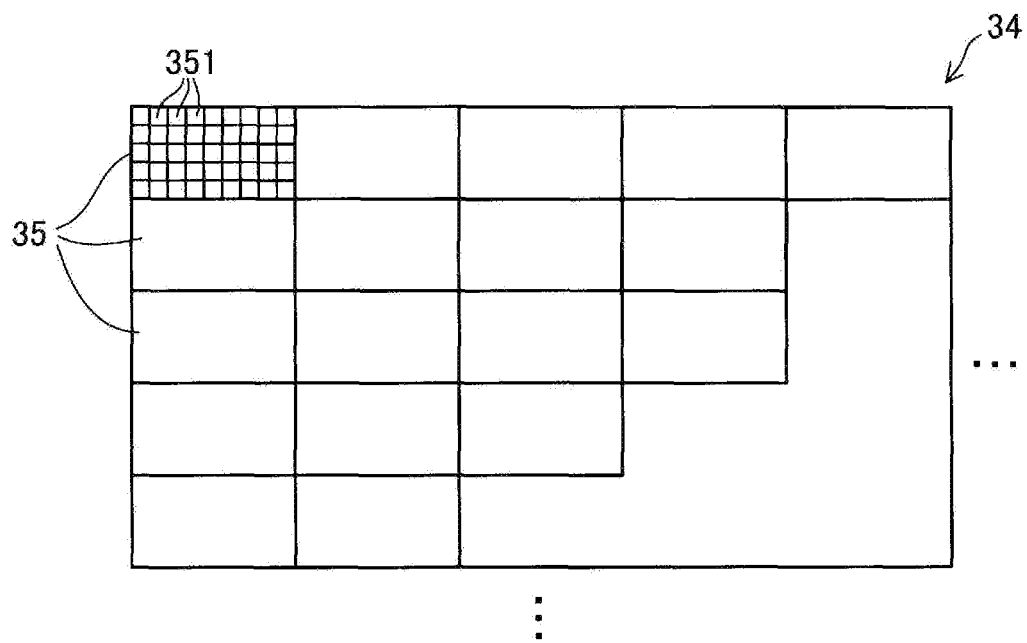
FIG. 3 is a view illustrating a schematic configuration of a light receiving unit.

As illustrated in FIG. 3, the light receiving circuit 34 includes a plurality of pixels 35 arranged in a two-dimensional array. Each pixel 35 includes a plurality of light receiving elements 351 which receive the pulsed light reflected from the object TG. In the present embodiment, each pixel 35 includes a single photon avalanche diode (SPAD) as the light receiving element 351. FIG. 3 illustrates an example where one pixel 35 is constituted with a SPAD array of a total of 45 SPADs of nine horizontally×five vertically. The light receiving circuit 34 is constituted by, for example, 64 pixels 35 being arranged in a vertical direction and 256 pixels 35 being arranged in a horizontal direction. When light (a photon) is input, each SPAD outputs a pulsed signal indicating incidence of light with a constant probability. Thus, each pixel 35 outputs 0 to 45 pulse signals in accordance with intensity of the received light. These pulse signals are added by an adder provided to the light receiving circuit 34, and the addition value is compared with a threshold determined in advance at a comparator provided to the light receiving circuit 34. In a case where the addition value exceeds the threshold, a response signal representing a numerical value which exceeds the threshold is output to the TDC circuit 36. The threshold is, for example, determined in accordance with intensity of ambient light. The TDC circuit 36 performs time-to-digital conversion on a timing at which the response signal is input. The light receiving unit 30 outputs the response signal and a signal representing a result of time-to-digital conversion by the TDC circuit 36 to the control unit 40.

The control unit 40 includes a timing generation unit 42, a histogram generation unit 44, and a distance determination unit 46. These units may be implemented as hardware with circuits or may be implemented as software by a CPU provided to the control unit 40 executing a program.

Figure 4:
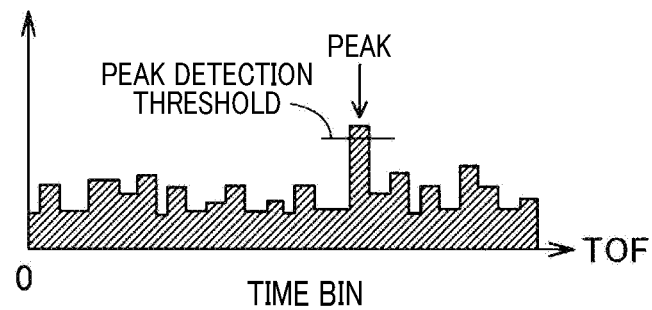
FIG. 4 is a view illustrating an example of a histogram.

The histogram generation unit 44 includes a memory 45 at which a histogram is generated. FIG. 4 illustrates an example of the histogram. The histogram indicates a time bin in accordance with time of flight (TOF) of light on a horizontal axis and indicates a value obtained by accumulating response signals output from the light receiving unit 30 on a vertical axis. Greater number of the time bin indicates a later timing at which the reflected light is received. In the present embodiment, the light source unit 20 emits the pulsed light in accordance with a timing generated by the timing generation unit 42 in units of the number of times (frequency) determined in advance. Then, the histogram generation unit 44 accumulates and records the response signal output from the light receiving unit 30 in a time bin designated by the output signal of the TDC circuit 36. In the present embodiment, the histogram generation unit 44 generates a histogram for each pixel 35.

The timing generation unit 42 controls a light emission timing of the pulsed light at the light source unit 20. Further, the timing generation unit 42 switches the bin number of the histogram in the memory 45 in which the response signals output from the light receiving unit 30 are recorded in accordance with the light emission timing of the pulsed light and the output signal from the TDC circuit 36. In the present embodiment, the timing generation unit 42 has a function of changing the light emission interval of the pulsed light by the light source unit 20 for each light emission. Further, the timing generation unit 42 has a function of changing a period from when the light source unit 20 starts light emission until when accumulation of the response signal to generate a histogram is started.

The distance determination unit 46 calculates a distance on the basis of the bin number in which a peak exceeding a peak detection threshold appears in the histogram. Specifically, if the TOF of the bin number corresponding to the peak is set as "t", light speed is set as "c" and a distance value is set as "D", the distance determination unit 46 calculates a distance value D by using the following expression (1). The distance determination unit 46 calculates the distance values D for all the pixels 35.

$$D=(c \times t)/2 \qquad \text{expression (1)}$$

The distance value D measured by the distance determination unit 46 is output from the optical distance measurement apparatus 10 to an electronic control unit (ECU), or the like, of a vehicle. The ECU of the vehicle detects an obstacle or measures distances to other vehicles by acquiring a distance value for each pixel from the optical distance measurement apparatus 10.

Figure 5:
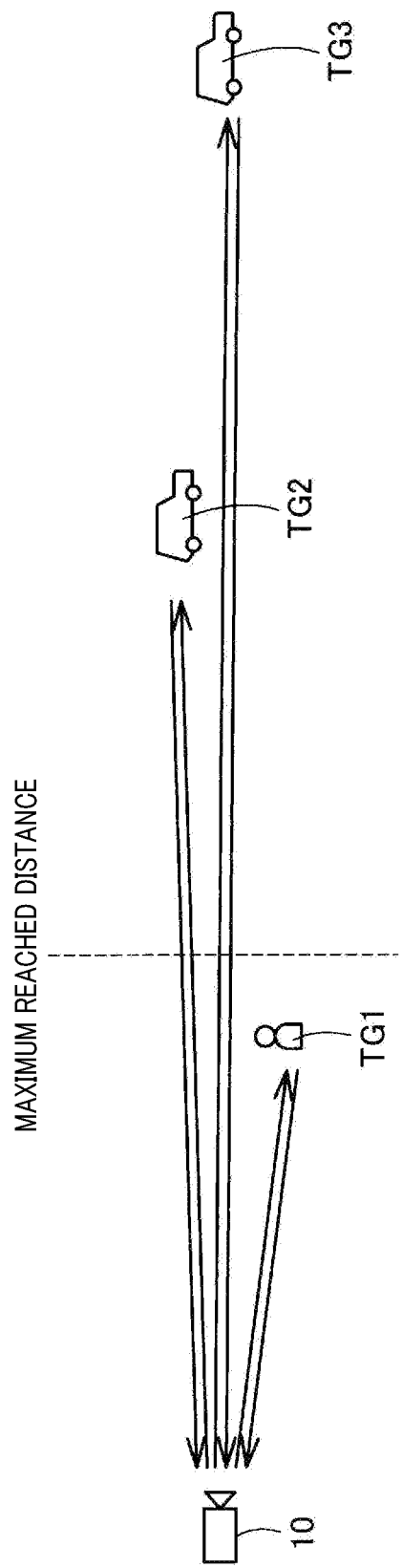
FIG. 5 is a view illustrating a positional relationship between the optical distance measurement apparatus and each object.

FIG. 5 is a view illustrating a positional relationship of objects (targets) to which distances are to be measured by the optical distance measurement apparatus 10. For example, the target TG1 is a person, and a target TG2 and a target TG3 are vehicles. Distances from the optical distance measurement apparatus 10 to these targets are different, and a distance from the optical distance measurement apparatus 10 is closer in order of the target TG1, the target TG2 and the target TG3. Positions of these targets TG1 to TG3 in the horizontal direction are different when viewed from the optical distance measurement apparatus 10. Thus, distances to these targets TG1 to TG3 are measured at different pixels 35 at the optical distance measurement apparatus 10. In the present embodiment, a distance to the target TG1 is shorter than a distance in which the pulsed light can travel back and forth at the shortest light emission interval set by the timing generation unit 42, and distances to the targets TG2 and TG3 are longer than the distance. Hereinafter, this distance will be referred to as a "maximum reached distance (maximum range)". The maximum reached distance becomes shorter as the light emission interval of the pulsed light is shorter and becomes longer as the light emission interval is longer.

Figure 6:
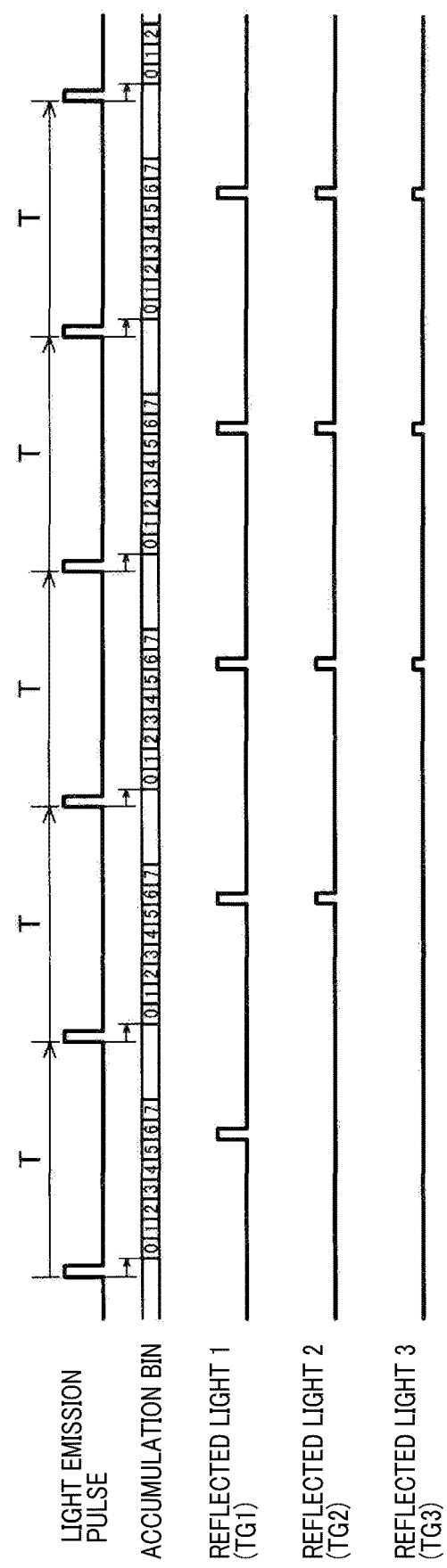
FIG. 6 is a timing chart according to a comparative example.
Figure 7:
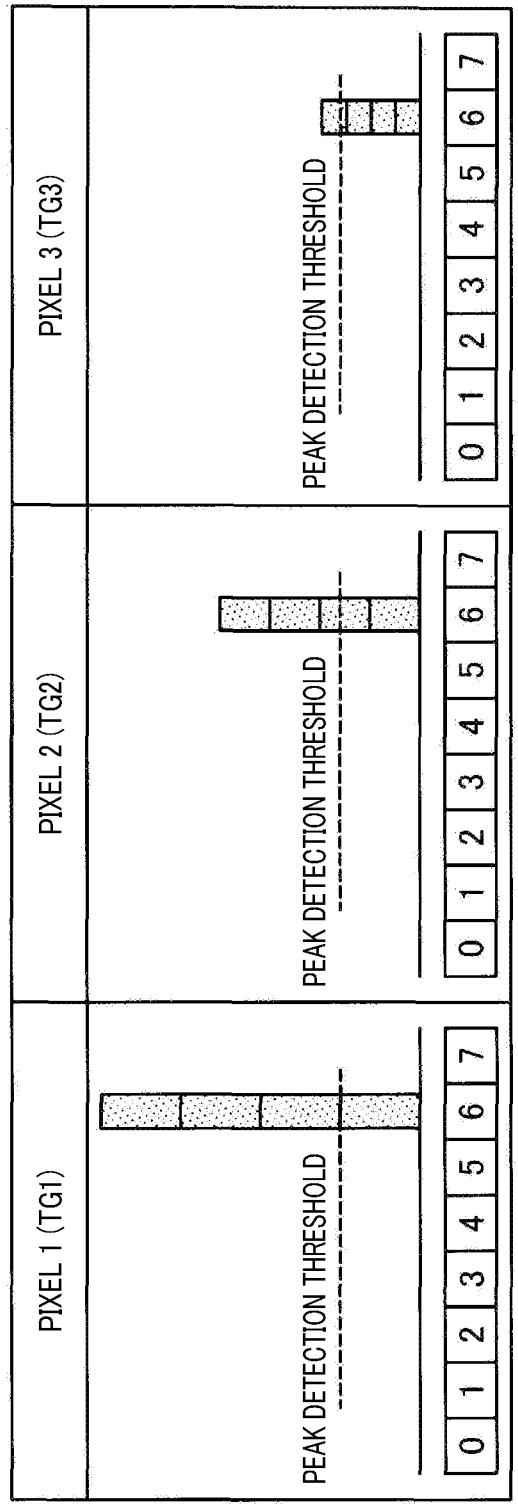
FIG. 7 is a view illustrating a histogram according to the comparative example.

FIG. 6 illustrates a comparative example of the light emission interval and timings at which the response signals are accumulated in the histogram. In the comparative example illustrated in FIG. 6, the light emission interval T at the light source unit 20 is constant. Further, a period from when the light source unit 20 starts light emission until when accumulation of the response signal to the histogram is started is fixed and constant. In such a circumference, in a case where a difference in distances between targets matches a distance which can be reached by light within the light emission interval of the pulsed light, there is a probability that the bin number in the histogram to which response signals in accordance with reflected light reflected from the respective targets TG1 to TG3 are accumulated may become all the same bin number. In the example illustrated in FIG. 6, response signals corresponding to reflected light from the respective targets are all accumulated to the same bin number 6. Then, as illustrated in FIG. 7, the response signals are respectively accumulated to the same bin number (bin number 6) in the histogram generated for pixels 35 corresponding to the respective targets TG1 to TG3, and in a case where the respective response signals exceed the peak detection threshold, the same distance value is calculated for all the targets TG1 to TG3. Particularly, in the present embodiment, the response signals are accumulated to the histogram a plurality of times. Thus, even for the target TG3 which is actually farther from the optical distance measurement apparatus 10 and from which a small response signal is transmitted, the peak exceeds the peak detection threshold as illustrated in FIG. 7 as a result of the response signals being accumulated, which increases a risk of an erroneous distance value being calculated.

Figure 8:
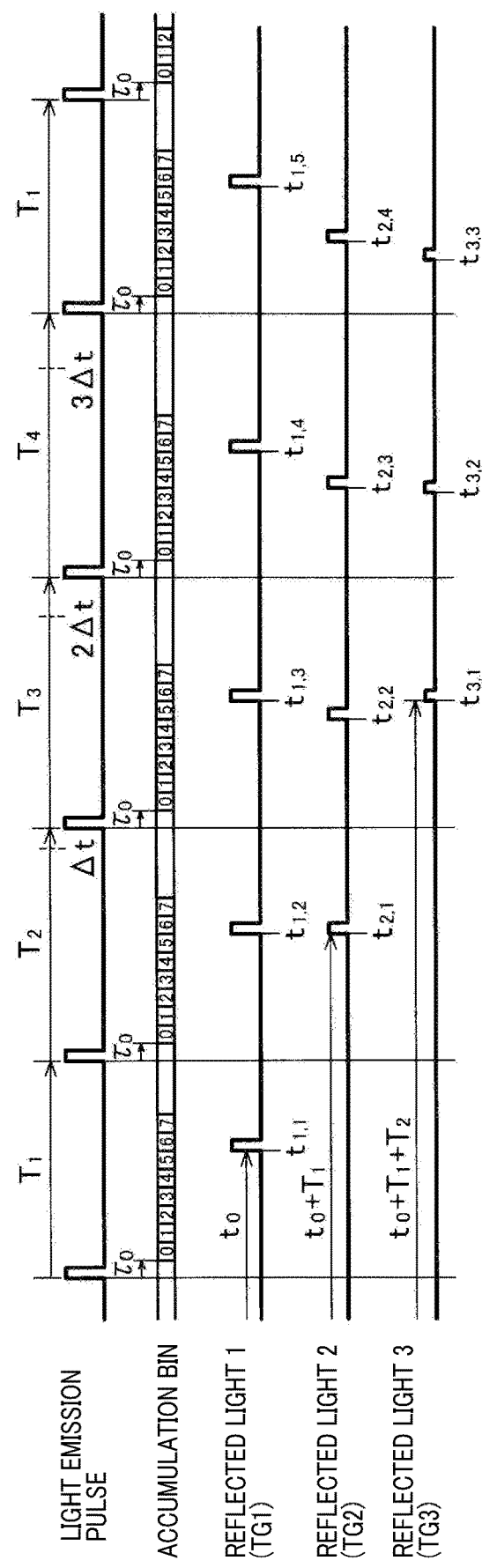
FIG. 8 is a timing chart according to the first embodiment.

FIG. 8 illustrates the light emission interval and timings at which the response signals are accumulated in the present embodiment. In the present embodiment, the timing generation unit 42 of the control unit 40 changes the light emission interval of the pulsed light by the light source unit 20 for each light emission. Specifically, a light emission interval T2 for the second light emission is a light emission interval obtained by adding a period Δt to a first light emission interval T1, a third light emission interval T3 is a light emission interval obtained by adding a period 2Δt to the first light emission interval T1, and a fourth light emission interval T4 is a light emission interval obtained by adding a period 3Δt to the first light emission interval T1. In other words, in the present embodiment, the control unit 40 linearly increments the light emission interval of the pulsed light by an amount corresponding to the period Δt. Δt is a period corresponding to one time bin. A fifth light emission interval is the same as the first light emission interval T1, and thereafter, the light emission interval is repeatedly gradually increased as described above. In other words, in the present embodiment, the pulsed light is emitted in units of four times of light emission (four times as one unit). Note that in the present embodiment, a period τ0 from when the light source unit 20 starts light emission until when accumulation of the response signal in the histogram is started is fixed in a similar manner to the above-described comparative example. Hereinafter, a period from when the light source unit 20 starts light emission until when accumulation of the response signal in the histogram is started will be referred to as an "accumulation start period".

Figure 9:
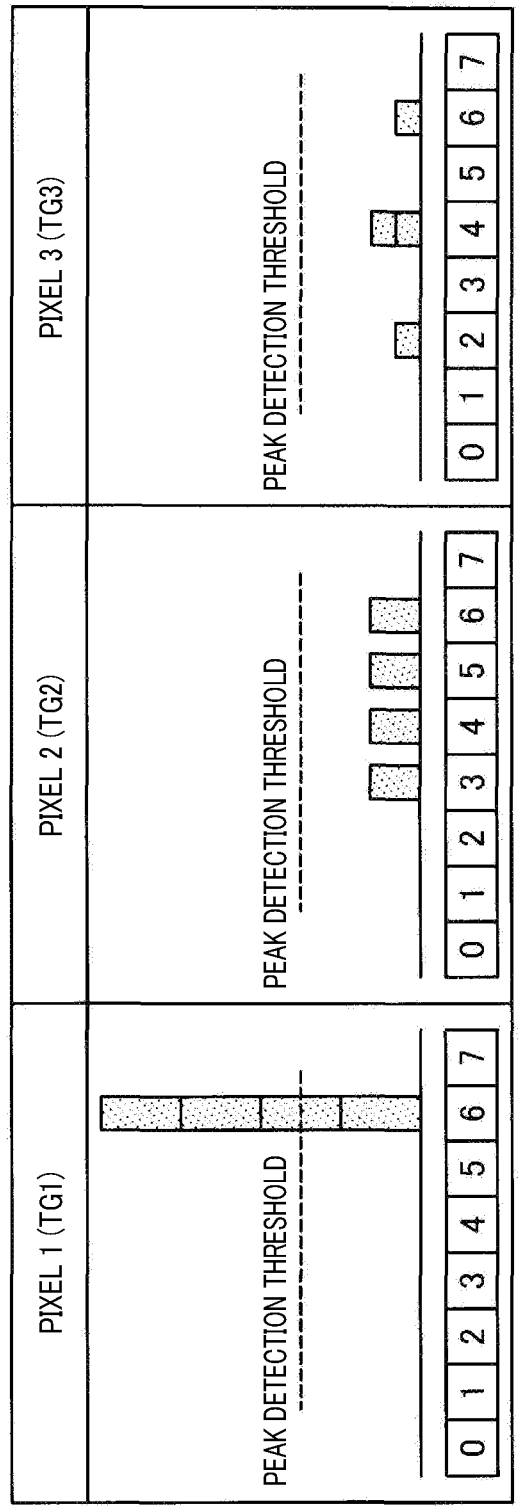
FIG. 9 is a view illustrating a histogram according to the first embodiment.

If the reflected light is received at the timings illustrated in FIG. 8, even if an initial response signal is recorded in the same bin number of bin number 6 for the respective targets TG1 to TG3, the light emission interval of the light source unit 20 increases by Δt, and thus, the bin number in which the response signals of the target TG2 and the target TG3 are recorded are gradually changed to a smaller bin number. Then, as illustrated in FIG. 9, while the response signals are always accumulated to the same bin number for the target TG1, the bin number in which the response signals are accumulated for the target TG2 is shifted to a smaller number one by one, and the bin number in which the response signals are accumulated for the target TG3 is shifted to a smaller number two by two. As a result of this, the bin number in which the response signals are recorded are distributed for the targets TG2 and TG3, and the accumulated value is less likely to exceed the peak detection threshold. Thus, only a distance to the target TG1 to which a distance from the optical distance measurement apparatus 10 is the shortest is calculated, and distances to the targets TG2 and TG3 to which distances from the optical distance measurement apparatus 10 are long are less likely to be calculated.

Thus, according to the first embodiment described above, the same distance value is less likely to be calculated for a plurality of targets to which distances from the optical distance measurement apparatus 10 are different, so that it is possible to reduce a probability of occurrence of erroneous detection that an target existing at a distance exceeding the maximum reached distance is erroneously detected as an object located within the maximum reached distance.

Further, in the present embodiment, a period from when the light source unit 20 starts light emission until when accumulation in the histogram is started is fixed, and the light emission interval by the light source unit 20 is simply linearly increased, and thus, the control unit 40 can easily perform timing control. Note that while the control unit 40 linearly increases the light emission interval by the light source unit 20 in the present embodiment, the control unit 40 may linearly decrease the light emission interval. Further, the control unit 40 may non-linearly increase or decrease the light emission interval or may randomly increase or decrease the light emission interval.

B. Second Embodiment

Figure 10:
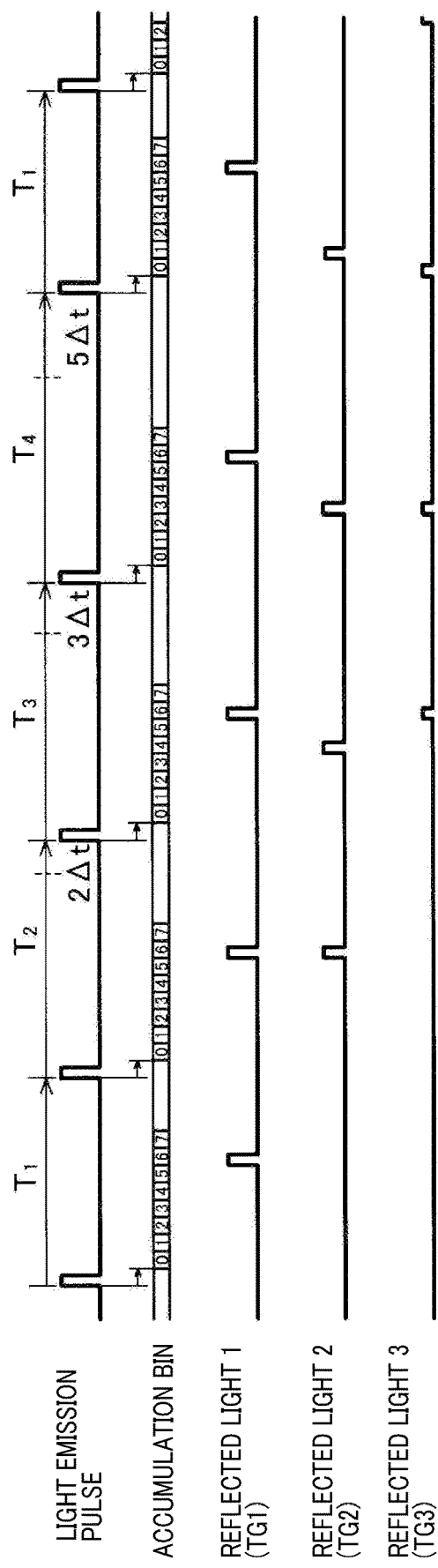
FIG. 10 is a timing chart according to a second embodiment.

As illustrated in FIG. 8, in the first embodiment described above, the control unit 40 linearly increases the light emission interval of the pulsed light by an amount corresponding to the period Δt. In contrast, in the second embodiment, as illustrated in FIG. 10, the timing generation unit 42 of the control unit 40 sets specific light emission intervals by setting the light emission interval T2 of the second light emission to a light emission interval obtained by adding a period 2 Δt to the initial light emission interval T1, setting the third light emission interval T3 to a light emission interval obtained by adding a period 3 Δt to the first light emission interval T1, and setting the fourth light emission interval T4 to a light emission interval obtained by adding a period 5 Δt to the first light emission interval T1. The specific light emission intervals may be intervals determined in advance or can be set by utilizing pseudo random numbers which are generated by using, for example, a linear feedback shift register, or the like. Note that also in the present embodiment, the accumulation start period is fixed in a similar manner to the first embodiment.

Figure 11:
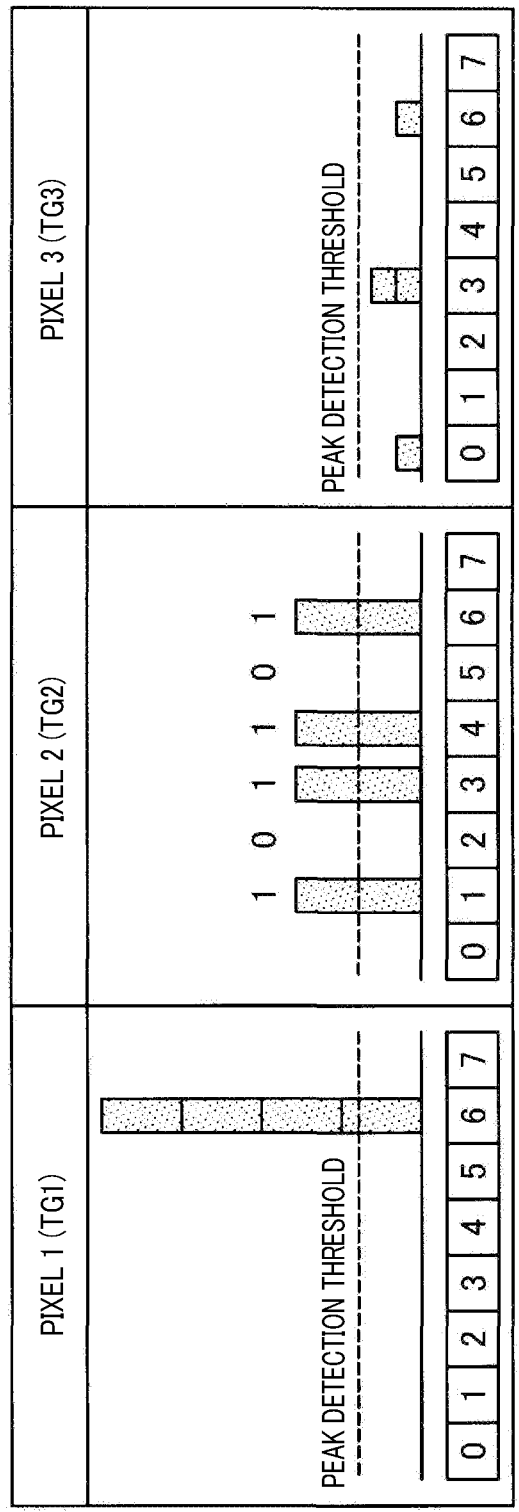
FIG. 11 is a view illustrating a histogram according to the second embodiment.

If the reflected light is received at timings illustrated in FIG. 10, as illustrated in FIG. 11, the bin number in which the response signals of the targets TG2 and TG3 are recorded is gradually shifted to smaller bin number, and thus, bins in which the response signals are accumulated are distributed in a similar manner to the first embodiment. Further, in the present embodiment, the light emission interval is set to specific light emission intervals instead of being linearly increased as described above. Thus, as illustrated in FIG. 11, the response signals are accumulated at the bin corresponding to specific positions for a pixel corresponding to the target TG2, and a specific pattern appears in the generated histogram. Thus, the control unit 40 of the present embodiment measures distances to both the targets TG1 and TG2 by utilizing such a specific pattern.

Figure 12:
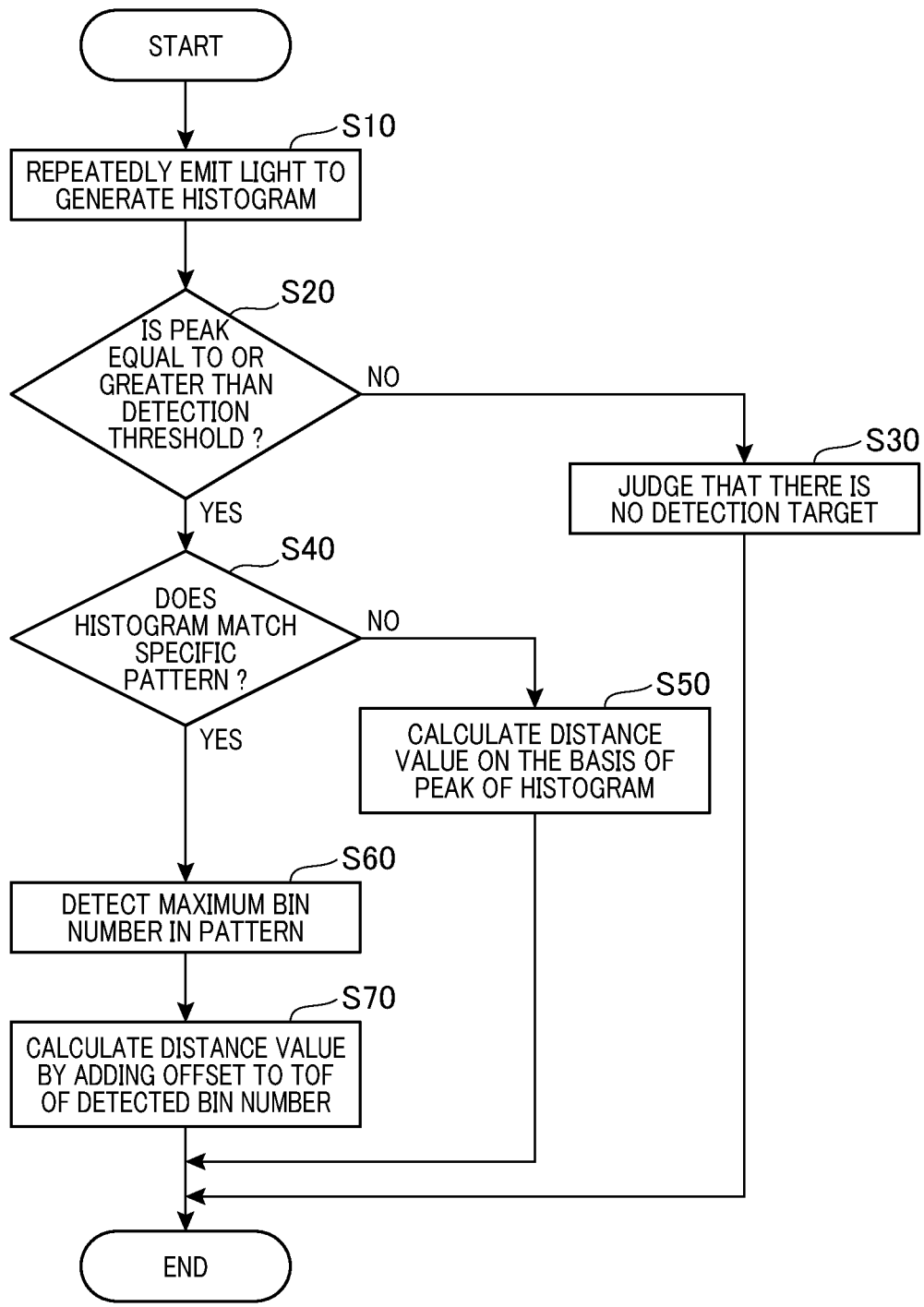
FIG. 12 is a flowchart of distance measurement processing.

FIG. 12 illustrates a flowchart of distance measurement processing to be performed by the control unit 40 according to the present embodiment. This distance measurement processing is processing to be repeatedly executed by the control unit 40 during operation of the optical distance measurement apparatus 10. In this distance measurement processing, first, the control unit 40 controls the light source unit 20 to repeatedly emit light at the timings illustrated in FIG. 10 and causes the histogram generation unit 44 to generate a histogram in step S10. In step S20, the control unit 40 determines whether a peak of the histogram is equal to or more than the peak detection threshold for each pixel. The control unit 40 determines that there is no object to be detected for pixels for which the peak of the histogram is less than the peak detection threshold and finishes the distance measurement processing in step S30.

For pixels for which the peak of the histogram is equal to or more than the peak detection threshold, the control unit 40 determines whether a position of the time bin in which the response signal is recorded in the histogram matches a specific pattern illustrated in FIG. 11 in step S40. For pixels for which the position of the time bin in which the response signal is recorded does not match the specific pattern, the control unit 40 causes the distance determination unit 46 to calculate a distance on the basis of the TOF indicated by the bin number of the peak of the histogram in step S50. Meanwhile, for pixels for which the position of the time bin in which the response signal is recorded matches the specific pattern, the control unit 40 determines that the reflected light has been received from the target TG2 which is farther than the target TG1, that is, a target existing at a distance exceeding the maximum reached distance, detects the maximum bin number in the pattern in step S60, and calculates a distance by adding an offset value determined in advance to the TOF indicated by the detected bin number in step S70. At the timings illustrated in FIG. 10, this offset value is time corresponding to the initial light emission interval T1. In step S60, the maximum bin number in the pattern is detected because number of the time bin in which the response signal is recorded becomes gradually smaller for the target TG2 in the present embodiment.

According to the second embodiment described above, a calculation method of a distance to an object can be changed in accordance with whether the specific pattern occurs in the histogram. Specifically, as described above, if the specific pattern does not appear in the histogram, a distance value is calculated as usual, and if the specific pattern occurs in the histogram, a distance value is calculated by adding the offset value determined in advance to the TOF indicated by the maximum bin number in the pattern. Thus, according to the present embodiment, it is possible to measure a distance to an object existing at a distance exceeding the maximum reached distance, so that it is possible to substantially increase the distance measurement range of the optical distance measurement apparatus 10.

C. Third Embodiment

Figure 13:
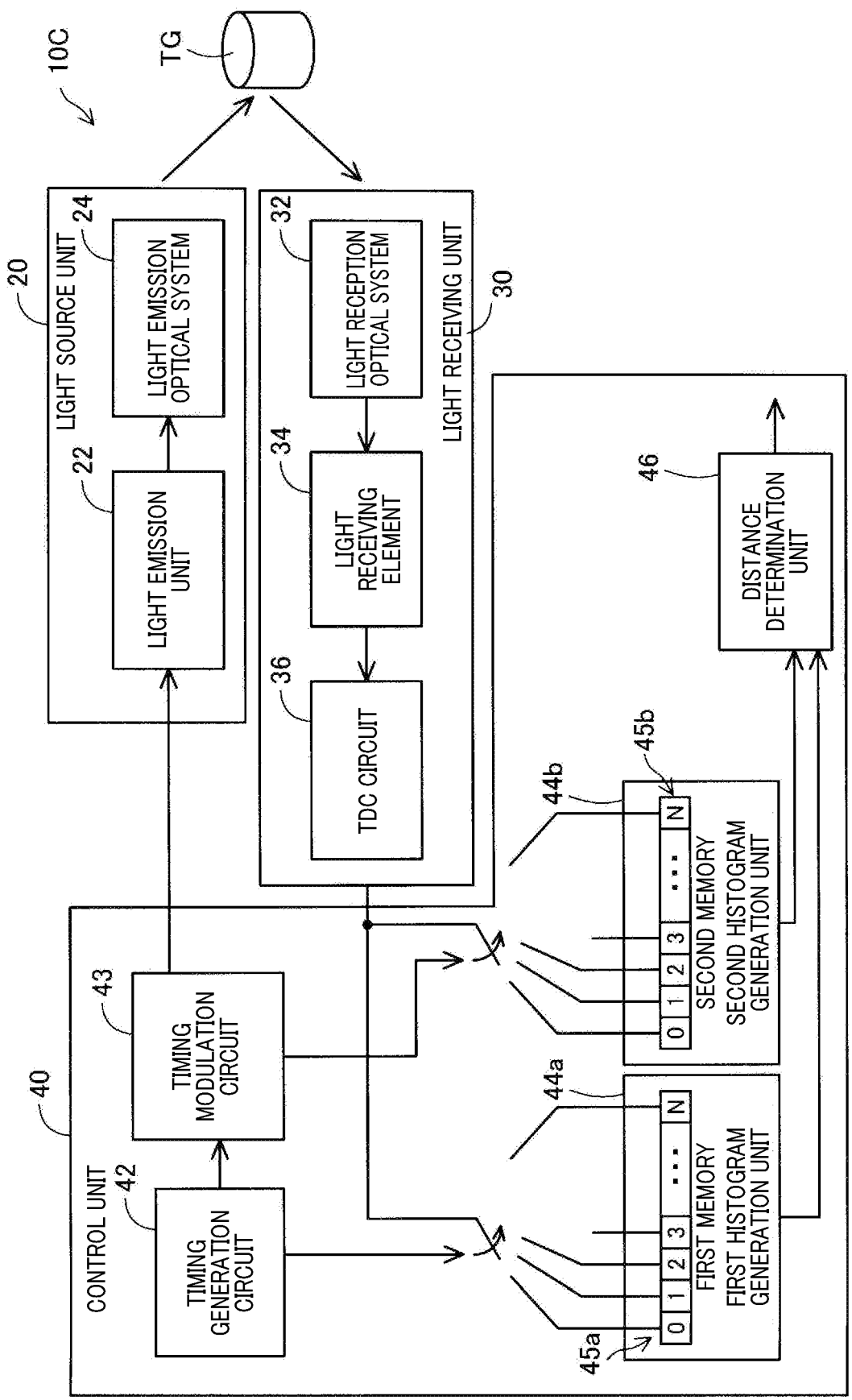
FIG. 13 is a block diagram of an optical distance measurement apparatus according to a third embodiment.

The optical distance measurement apparatus 10 in the first embodiment and the second embodiment described above includes one memory 45 for generating a histogram for each pixel. In contrast, the optical distance measurement apparatus 10C in the third embodiment includes two histogram generation units 44a and 44b as illustrated in FIG. 13, and the histogram generation units 44a and 44b respectively include one memory 45a (45b). In other words, in the present embodiment, two histograms are generated for each pixel. Timings at which response signals are accumulated to the histogram generated by the first histogram generation unit 44a are controlled by the timing generation unit 42, and timings at which response signals are accumulated to the histogram generated by the second histogram generation unit 44b are controlled by a timing modulation circuit 43 which modulates the timing generated by the timing generation 42.

Figure 14:
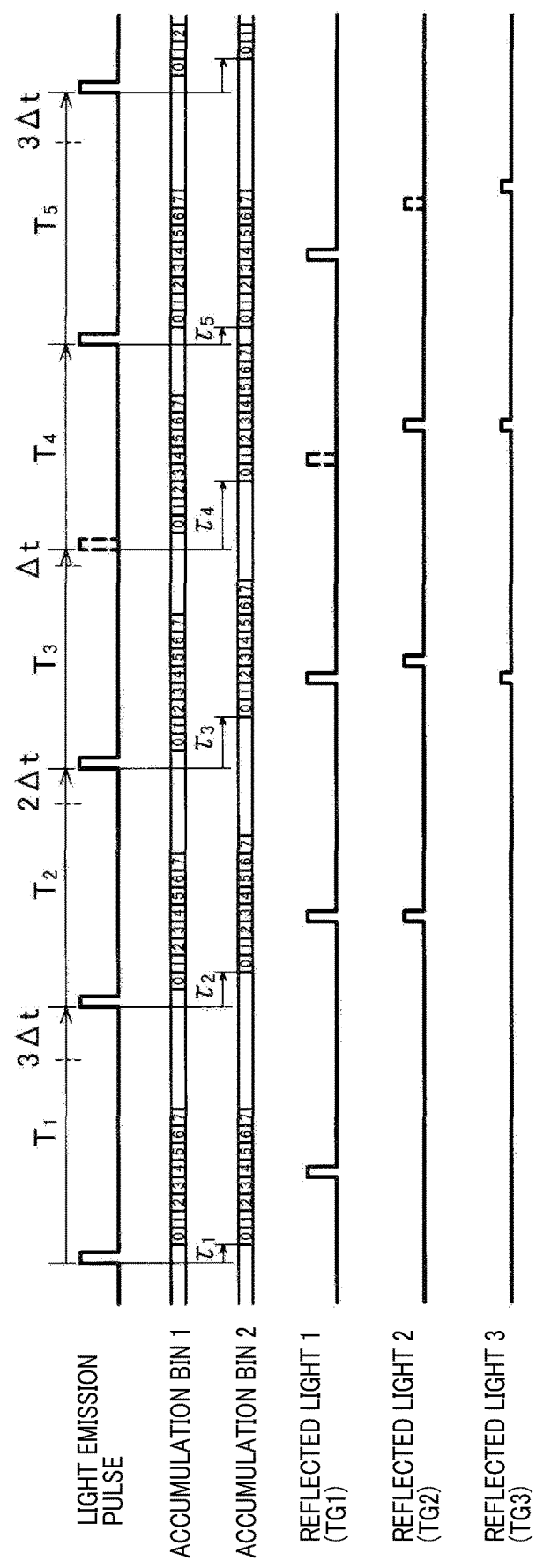
FIG. 14 is a timing chart according to the third embodiment.

As illustrated in FIG. 14, in the present embodiment, the control unit 40 sets the light emission interval T1 of the first light emission to a light emission interval obtained by adding a period 3Δt to the light emission interval T4 of the fourth light emission, sets the light emission interval T2 of the second light emission to a light emission interval obtained by adding a period 2Δt to the light emission interval T4 of the fourth light emission, and sets the light emission interval T3 of the third light emission to a light emission interval obtained by adding a period Δt to the fourth light emission interval T4. Also in the present embodiment, the control unit 40 causes the pulsed light to be emitted in units of four times of light emission (four times as one unit).

In the present embodiment, the accumulation start period is changed for each histogram generation unit, that is, for each memory. Specifically, the accumulation start period is fixed for the first histogram generation unit 44a, and the accumulation start period is incremented by a period corresponding to one time bin for the second histogram generation unit 44b. In other words, in the present embodiment, while the light emission interval becomes linearly shorter, the accumulation start period at the second histogram generation unit 44b becomes linearly later. Note that in the present embodiment, if the fourth light emission is performed, the bin number in which the response signal in accordance with the reflected light from the target TG2 is recorded in the histogram of the second histogram generation unit 44b at a timing at which a cycle of the light emission pulse returns becomes different from the bin number in which the response signals for light emission so far are recorded, and thus, the fourth light emission is actually not performed. For example, in FIG. 14, while the bin number in which the response signal is expected to be recorded in the histogram of the second histogram generation unit 44b is 3, in a case where the fourth light emission is performed, the response signal is recorded in the bin number of 7.

Figure 15:
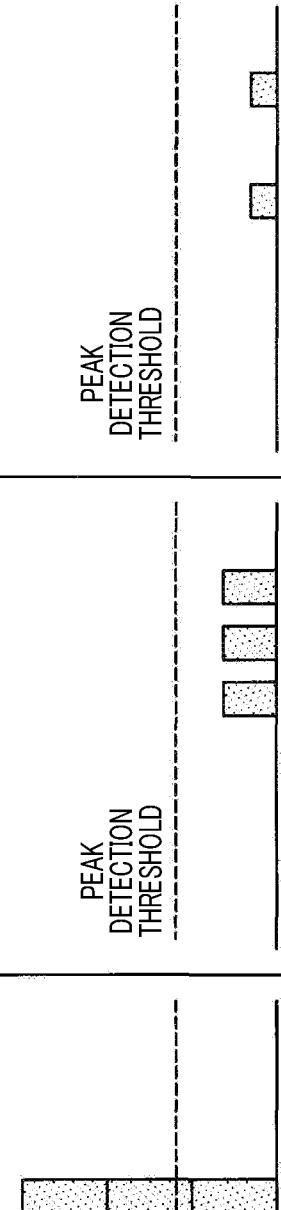
FIG. 15 is a view illustrating a histogram according to the third embodiment.

If the reflected light is received at timings illustrated in FIG. 14, as illustrated in FIG. 15, while a histogram is generated at the first memory 45a of the first histogram generation unit 44a by response signals being always accumulated in the same bin number for the target TG1, a histogram is generated while the bin number in which response signals are accumulated is shifted to greater number by one for the target TG2, and the bin number is shifted to greater number by two for the target TG3. Thus, time bins in which response signals are recorded are distributed for the target TG2 and the target TG3. Further, a histogram is generated at the second memory 45b of the second histogram generation unit 44b while time bins in which the response signals are recorded being distributed for the target TG1 and the target TG3, and a histogram is generated by the response signals being accumulated in the same bin number for the target TG2. The distance determination unit 46 can calculate a distance to the target TG2 by adding the TOF indicated by the time bin corresponding to a peak of the histogram generated at the second memory 45b to an offset value determined in accordance with the light emission interval and the accumulation start period.

According to the third embodiment described above, it is possible to obtain the distance to the target TG1 existing within the maximum reached distance by using the position of the peak of the histogram generated at the first memory 45a, and it is possible to obtain the distance to the target TG2 existing outside the maximum reached distance by using the position of the peak of the histogram generated at the second memory 45b. Thus, use of two memories enables distances to an object existing within the maximum reached distance and an object existing outside the maximum reached distance to be easily calculated. Note that while the fourth light emission is not performed in the present embodiment, it is possible to easily make up for decrease in an SN ratio associated with decrease in the number of times of light emission by increasing the number of times of light emission per unit light emission.

D. Fourth Embodiment

Figure 16:
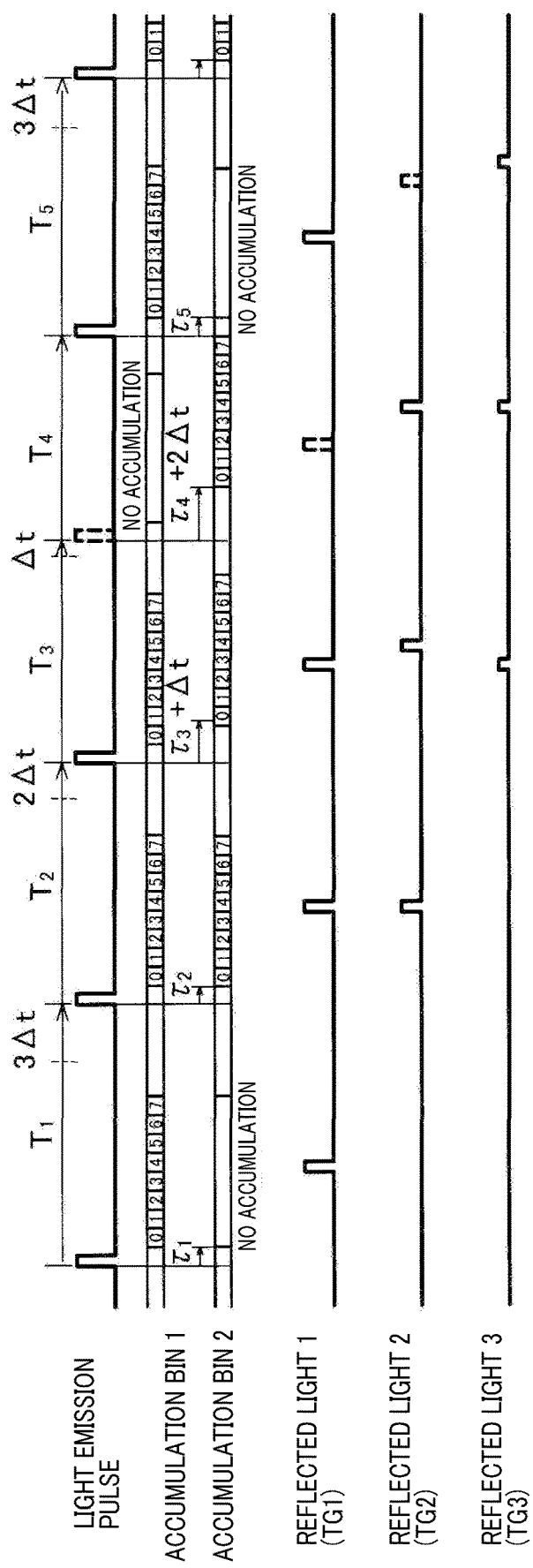
FIG. 16 is a timing chart according to a fourth embodiment.

A fourth embodiment is the same as the third embodiment in that histograms are respectively generated by using two memories. In contrast, the fourth embodiment is greatly different from the third embodiment in that accumulation to the histogram is not performed while it is assumed that reflected light is not returned as illustrated in FIG. 16. Specifically, in the present embodiment, the control unit 40 neither performs accumulation to the histogram using the second memory 45b in a first light emission cycle nor accumulation to the histogram using the first memory 45a in a fourth light emission cycle. Further, a timing at which accumulation to the histogram using the second memory 45b is started is earlier in the present embodiment than in the third embodiment by an amount corresponding to one time bin in second to fourth light emission.

Figure 17:
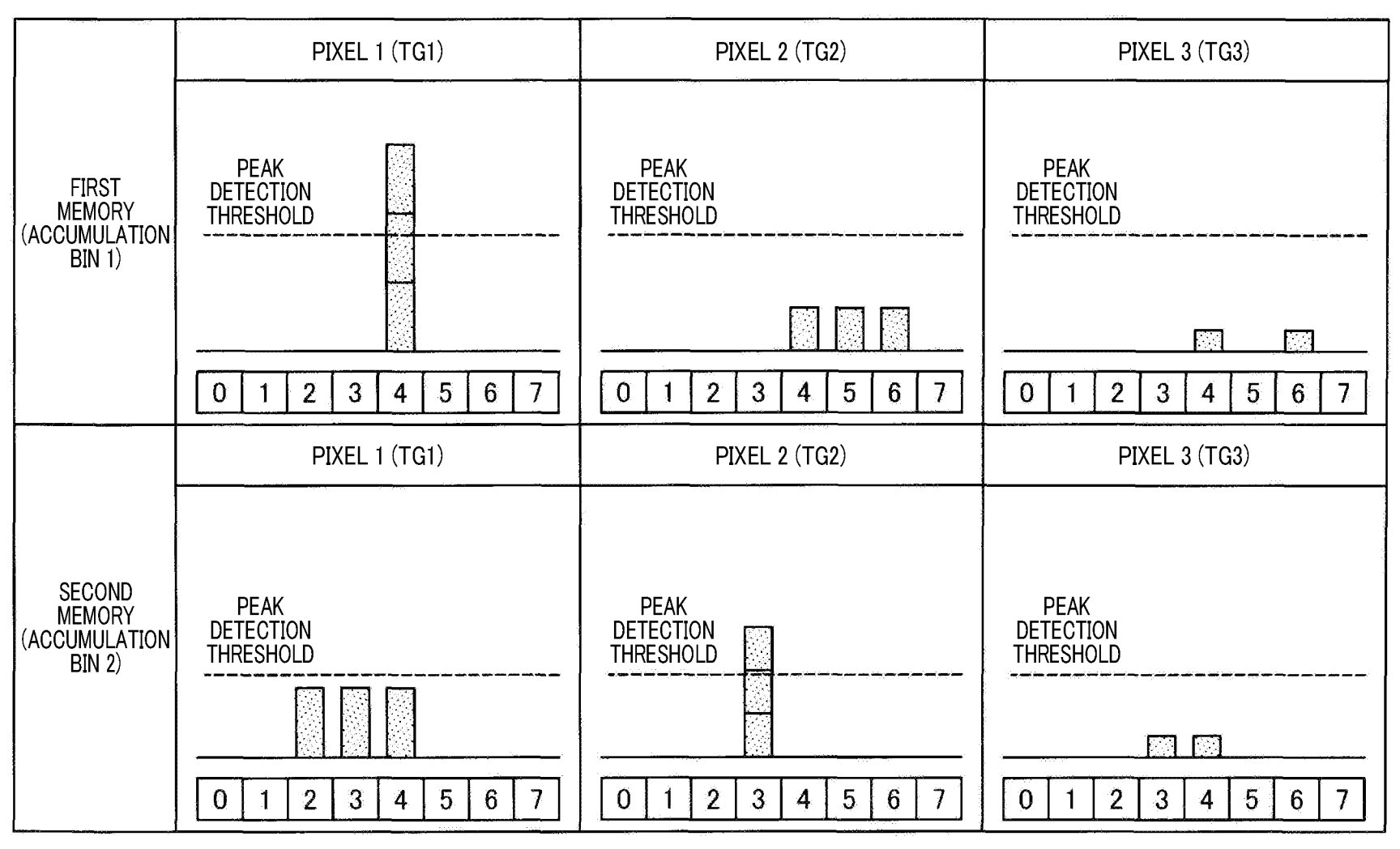

If the reflected light is received at timings illustrated in FIG. 16, as illustrated in FIG. 17, while a histogram is generated at the first memory 45a of the first histogram generation unit 44a by response signals being always accumulated in the same bin number for the target TG1, a histogram is generated while the bin number in which the response signals are accumulated is shifted to greater number by one for the target TG2 and the bin number is shifted to greater number by two for the target TG3. Thus, time bins in which the response signals are recorded are distributed for the target TG2 and the target TG3. Meanwhile, a histogram is generated at the second memory 45b of the second histogram generation unit 44b while time bins in which the response signals are recorded are distributed for the target TG1 and the target TG3, and a histogram is generated by response signals being accumulated in the same bin number for the target TG2.

According to the fourth embodiment described above, it is possible to easily calculate distances to an object existing within the maximum reached distance and an object outside the maximum reached distance by using two memories in a similar manner to the third embodiment. Further, in the present embodiment, accumulation in the histogram is not performed during a period while it is assumed that the reflected light is not returned for each of the first memory 45a and the second memory 45b. It is therefore possible to prevent response signals generated due to ambient light from being accumulated in the histogram, so that it is possible to improve an SN ratio of the light receiving unit 30.

E. Fifth Embodiment

Figure 18:
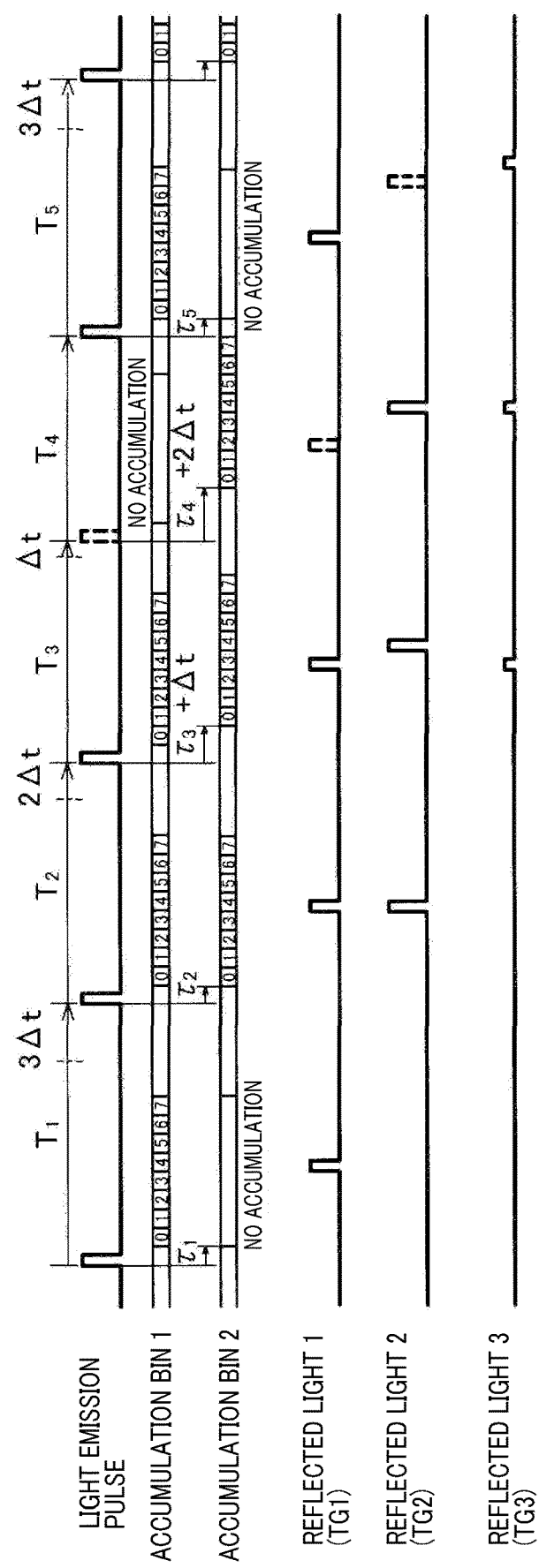
FIG. 18 is a timing chart according to a fifth embodiment.
Figure 19:
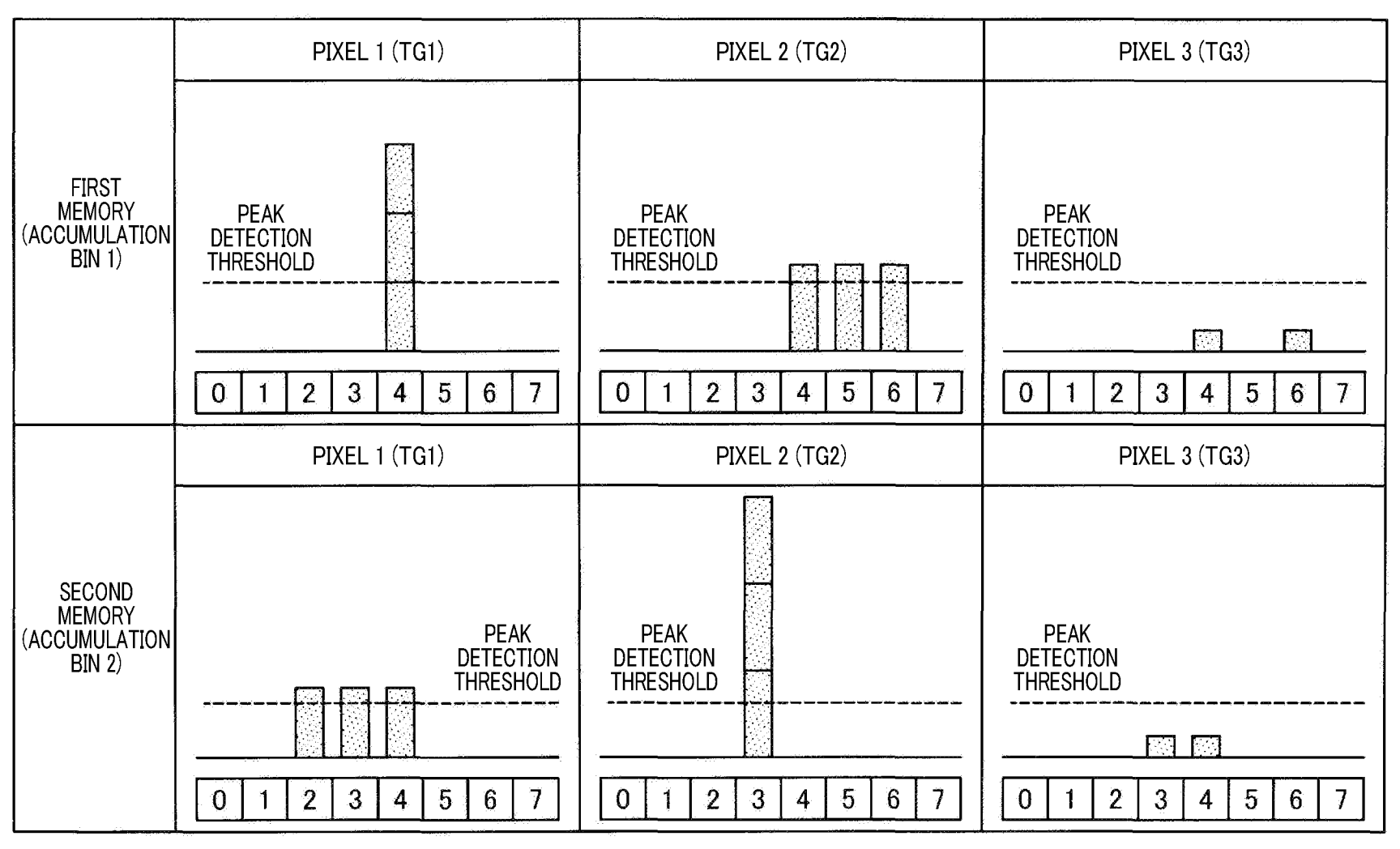

In a case where a histogram is generated at each timing in the fourth embodiment illustrated in FIG. 16, for example, a case is assumed where a reflectance of the target TG2 is the highest as illustrated in FIG. 18. Then, as illustrated in FIG. 19, there is a probability that a degree of the histogram generated by the reflected light of the target TG2 becomes greater and may exceed the peak detection threshold for both the histogram generated in the first memory 45a and the histogram generated at the second memory 45b. However, even in such a case, the control unit 40 can determine whether there is reflected light of pulsed light from the target TG2 which is farther than the target TG1 by comparing a shape of the histogram generated at the first memory 45a with a shape of the histogram generated at the second memory 45b.

Specifically, if a degree (height) of the peak of the histogram generated at the first memory 45a is greater than a degree of the peak of the histogram generated at the second memory 45b for the same pixel, the position of the peak generated at the first memory 45a represents a distance to the target TG1 existing within the maximum reached distance. Further, if the degree of the peak generated at the second memory 45b is greater than the degree of the peak generated at the first memory 45a and the peak generated at the second memory 45b is sharper than the peak generated at the first memory 45a, the pulsed light is reflected from the target TG2 which is farther than the target TG1, and thus, the position of the peak generated at the second memory 45b represents a distance to the target TG2 existing outside the maximum reached distance. Thus, the control unit 40 can easily calculate distances to objects existing within the maximum reached distance and objects existing outside the maximum reached distance without generating a specific pattern by comparing the shape of the histograms generated at the two memories on the basis of the above-described criteria even in a case where the reflectance of the target TG2 existing outside the maximum reached distance is high.

F. Sixth Embodiment

Figure 20:
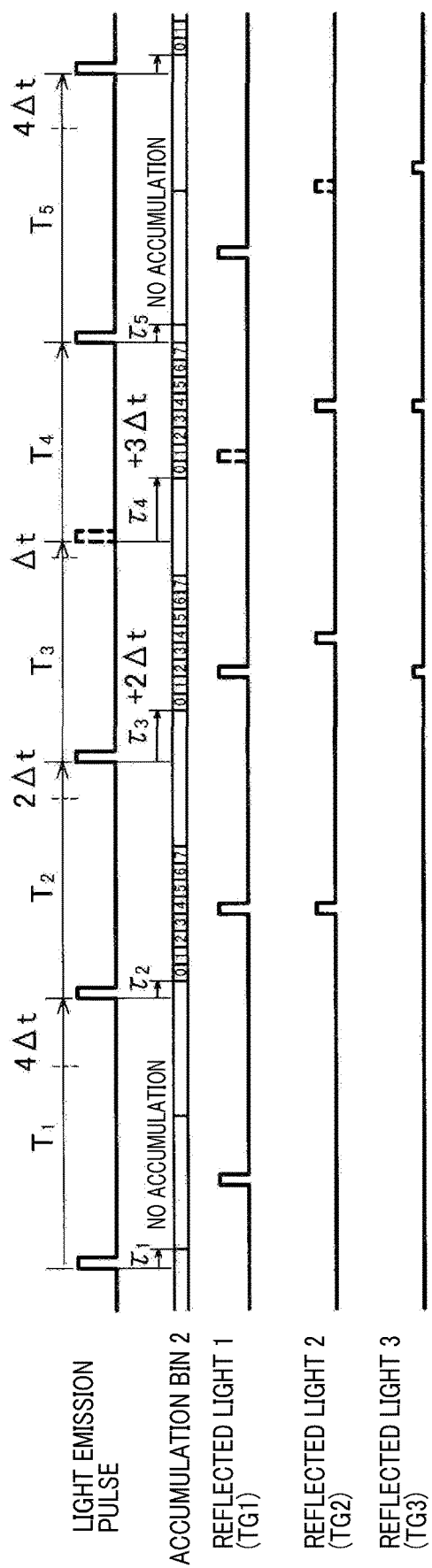
FIG. 20 is a timing chart according to a sixth embodiment.
Figure 21:
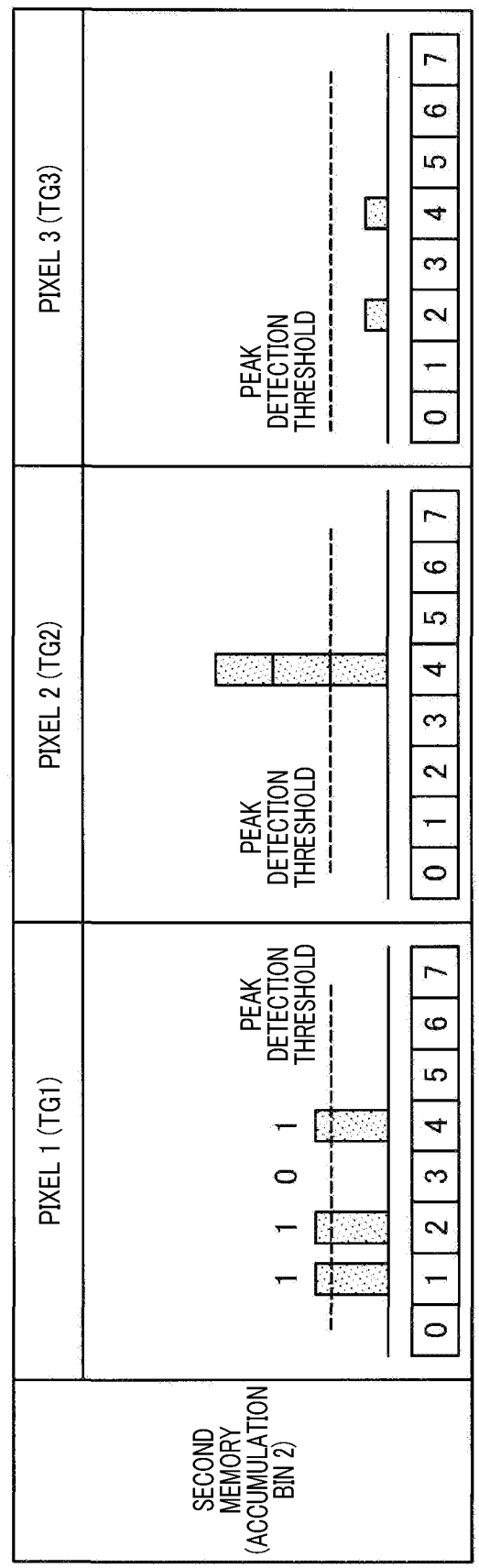
FIG. 21 is a view illustrating a histogram according to the sixth embodiment.

In a sixth embodiment, only the second memory 45b is used without using the first memory 45a. Then, as illustrated in FIG. 20, the light emission interval is gradually shortened by a period Δt and further, the accumulation start period is gradually delayed. By adjusting a ratio between the light emission interval and the accumulation start period as appropriate in this manner, it is possible to generate a specific pattern in the histogram with the reflected light from the target TG1 existing within the maximum reached distance as illustrated in FIG. 21. Thus, even in a case where both the light emission interval and the accumulation start time are made to fluctuate, the control unit 40 can obtain a distance value of the target TG1 existing within the maximum reached distance and a distance value of the target TG2 existing outside the maximum reached distance by detecting whether there is a pattern without using two memories, by executing processing similar to the processing illustrated in FIG. 12 in a similar manner to the second embodiment. In the examples illustrated in FIG. 20 and FIG. 21, the distance determination unit 46 can calculate a distance to the target TG1 on the basis of the TOF of the time bin corresponding to the maximum bin number in the pattern in a case where a specific pattern is detected in the histogram. Further, in a case where a specific pattern is not detected, the distance determination unit 46 can calculate a distance to the target TG2 by adding an offset value determined in accordance with the light emission interval and the accumulation start period to the TOF of the time bin corresponding to the peak of the histogram which exceeds the peak detection threshold.

G. Other Embodiments (G1) The light emission interval, the accumulation start period and the number of times of light emission per unit in the above-described respective embodiments are examples, and arbitrary values can be set if the histogram having characteristics in the respective embodiments is generated.

(G2) In the above-described embodiments, the light receiving circuit 34 has a plurality of pixels. In contrast, the light receiving circuit 34 may include only one pixel. Also in this case, it is possible to prevent objects at different distances captured at different timings at the pixel from being calculated as objects at the same distance.

(G3) In the above-described embodiments, an SPAD is employed as a light receiving element. However, the light receiving element is not limited to an SPAD, and other elements may be used. For example, a PIN photodiode, an avalanche photodiode, or the like, can be employed as the light receiving element.

(G4) In the above-described embodiments, the optical distance measurement apparatus 10 employs an optical system having different optical axes in which an optical axis in light projection is different from an optical axis in light reception. In contrast, the optical distance measurement apparatus 10 may employ an optical system having the same optical axis in which an optical axis in light projection is the same as an optical axis in light reception. Further, while pixels are arranged in a plane in a vertical direction and in a horizontal direction in the above-described embodiments, pixels may be arranged in line in a predetermined direction. Further, while the optical distance measurement apparatus 10 employs a 1D scanning scheme in which scanning is performed with strip-shaped light in one direction as a scanning scheme, the optical distance measurement apparatus 10 may employ a 2D scanning scheme in which scanning is performed with dotted line in a two-dimensional direction. Further, the optical distance measurement apparatus 10 may be a flash type apparatus which radiates light in a wide range without performing scanning with light.

The present disclosure is not limited to the above-described embodiments and can be implemented with various configurations without deviating from the gist of the present disclosure. For example, technical features in the respective embodiments may be replaced or combined as appropriate to solve part or all of the above-described problems or to achieve part or all of the above-described effects. Further, the technical features which are not described as essential features in the present specification can be deleted as appropriate.

The control unit and the method thereof described in the present specification may be implemented with a dedicated computer constituted with a processor and a memory which are programmed to execute one or a plurality of functions embodied by a computer program. Alternatively, the control unit and the method thereof described in the present disclosure may be implemented with a dedicated computer obtained by constituting a processor with one or more dedicated hardware logic circuits. Alternatively, the control unit and the method thereof described in the present disclosure may be implemented with one or more dedicated computers constituted with combination of a processor and a memory programmed to execute one or a plurality of functions and a processor constituted with one or more hardware logic circuits. Further, the computer program may be stored in a computer-readable non-transitory tangible recording medium as instructions to be executed by the computer.

According to an aspect of the present disclosure, an optical distance measurement apparatus (10) is provided. The optical distance measurement apparatus includes: a light source unit (20) configured to emit pulsed light in units of a number of times (in groups of a number of pulses, in units of a number of pulses) determined in advance; a light receiving unit (30) including a light receiving element which receives the pulsed light reflected from a first object and configured to output a response signal in accordance with received light intensity of the pulsed light; and a control unit (40) configured to generate a histogram by accumulating and recording the response signal output from the light receiving unit, corresponding to the number of times, in a time bin in accordance with time of flight of the pulsed light and calculate a distance to the first object on a basis of the histogram. The control unit changes a light emission interval of the pulsed light by the light source unit within a unit of the number of times.

According to the optical distance measurement apparatus in this aspect, the light emission interval of the pulsed light is changed for each light emission, so that it is possible to prevent response signals respectively corresponding to reflected light reflected from objects to which distances are different from being accumulated to the same bin number in the histogram. It is therefore possible to prevent the same distance value from being calculated for objects to which distances are different.

The present disclosure can be implemented with various aspects other than the optical distance measurement apparatus. For example, the present disclosure can be implemented with aspects such as an optical distance measurement method, a vehicle to which the optical distance measurement apparatus is mounted, a control method for controlling the optical distance measurement apparatus, or the like.

What is claimed is:
1. An optical distance measurement apparatus comprising:
a light source unit configured to emit pulsed light in units of a number of times determined in advance;
a light receiving unit including a light receiving element which receives the pulsed light reflected from a first object and configured to output a response signal in accordance with received light intensity of the pulsed light; and a control unit configured to generate a histogram by accumulating and recording the response signal output from the light receiving unit, corresponding to the number of times, in a time bin in accordance with time of flight of the pulsed light and calculate a distance to the first object on a basis of the histogram, wherein the control unit changes a light emission interval of the pulsed light by the light source unit within a unit of the number of times, the control unit fixes an accumulation start period from when the light source unit starts light emission until when accumulation of the response signal in the histogram is started, the control unit sets the light emission interval so that a specific pattern appears in a position of a time bin in which the response signal is recorded in the histogram, the control unit determines whether the pulsed light is reflected from a second object which is farther from the first object in accordance with whether the pattern occurs in the histogram.

2. The optical distance measurement apparatus according to claim 1, wherein the control unit linearly increases or decreases the light emission interval.

3. The optical distance measurement apparatus according to claim 1, wherein the control unit calculates a distance to the second object by adding an offset value determined in advance to time of flight indicated by a time bin in which the pattern has occurred.

4. The optical distance measurement apparatus according to claim 1, wherein the control unit sets the light emission interval and the accumulation start period so that a specific pattern appears in the histogram generated on a basis of the pulsed light reflected from the first object, and the control unit calculates a distance to the first target on a basis of time of flight indicated by a time bin in which the pattern has occurred.

5. The optical distance measurement apparatus according to claim 4, wherein the control unit linearly increases or decreases the light emission interval.

6. The optical distance measurement apparatus according to claim 4, wherein the control unit calculates a distance to the second object by adding an offset value determined in advance to time of flight indicated by a time bin in which the pattern has occurred.

7. The optical distance measurement apparatus according to claim 4, wherein the control unit sets the light emission interval and the accumulation start period so that a specific pattern appears in the histogram generated on a basis of the pulsed light reflected from the first object, and the control unit calculates a distance to the first target on a basis of time of flight indicated by a time bin in which the pattern has occurred.

8. An optical distance measurement apparatus comprising:

a light source unit configured to emit pulsed light in units of a number of times determined in advance;

a light receiving unit including a light receiving element which receives the pulsed light reflected from a first object and configured to output a response signal in accordance with received light intensity of the pulsed light; and a control unit configured to generate a histogram by accumulating and recording the response signal output from the light receiving unit, corresponding to the number of times, in a time bin in accordance with time of flight of the pulsed light and calculate a distance to the first object on a basis of the histogram, wherein the control unit changes a light emission interval of the pulsed light by the light source unit within a unit of the number of times, the control unit further changes an accumulation start period from when the light source unit starts light emission until when accumulation of the response signal to the histogram is started within a unit of the number of times, the control unit generates a first histogram while fixing a period from when the light source unit starts light emission until when accumulation of the response signal is started, generates a second histogram by changing the period from when the light source unit starts light emission until when accumulation of the response signal is started within a unit of the number of times, and determines whether the pulsed light is reflected from a second object which is farther from the first object by comparing a shape of the first histogram with a shape of the second histogram.

* * * * *